United States Patent
Line et al.

(10) Patent No.: US 9,216,677 B2
(45) Date of Patent: Dec. 22, 2015

(54) QUICK-CONNECT TRIM CARRIER ATTACHMENT

(71) Applicant: Ford Global Technologies, LLC, Dearborn, MI (US)

(72) Inventors: Johnathan Andrew Line, Northville, MI (US); Marc Kondrad, Macomb Township, MI (US); John W. Jaranson, Dearborn, MI (US); Daniel Ferretti, Commerce Township, MI (US); Christian Hosbach, Allen Park, MI (US); Mandeep Singh Sidhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 13/749,584

(22) Filed: Jan. 24, 2013

(65) Prior Publication Data
US 2014/0203618 A1  Jul. 24, 2014

(51) Int. Cl.
*B60N 2/58* (2006.01)
*B60N 2/60* (2006.01)

(52) U.S. Cl.
CPC ............ *B60N 2/5816* (2013.01); *B60N 2/6027* (2013.01)

(58) Field of Classification Search
USPC ................. 297/230.14, 354.11, 354.1, 284.1, 297/284.3, 440.2, 452.54, 452.55, 452.56
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David R Dunn
*Assistant Examiner* — Timothy J Brindley
(74) *Attorney, Agent, or Firm* — Vichit Chea; Price Heneveld LLP

(57) ABSTRACT

A quick-connect assembly for a vehicle seating assembly includes a seatback structure. A suspension assembly includes a plurality of outwardly extending flex members. A removable trim carrier is disposed over upper and lower components and is removably coupled to distal ends of the plurality of outwardly extending flex members by a friction-fit connection. A cushion is operably coupled with the trim carrier. An external peripheral gap is defined between the passenger support and the seatback structure.

16 Claims, 7 Drawing Sheets

(56) References Cited

U.S. PATENT DOCUMENTS

| | | |
|---|---|---|
| 5,013,089 A | 5/1991 | Abu-Isa et al. |
| 5,171,062 A | 12/1992 | Courtois |
| 5,174,526 A | 12/1992 | Kanigowski |
| 5,370,443 A * | 12/1994 | Maruyama ................ 297/284.1 |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,899,399 B2 | 5/2005 | Ali et al. |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,967,379 B2 * | 6/2011 | Walters et al. ............. 297/284.3 |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,297,708 B2 * | 10/2012 | Mizobata et al. ........ 297/452.56 |
| 2004/0195870 A1 | 10/2004 | Bohlender et al. |
| 2005/0200166 A1 | 9/2005 | Noh |
| 2006/0043777 A1 | 3/2006 | Friedman et al. |
| 2006/0244301 A1 * | 11/2006 | Jeffries .................... 297/452.55 |
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0322124 A1 | 12/2009 | Barkow et al. |
| 2010/0026066 A1 * | 2/2010 | Graber et al. ............. 297/284.1 |
| 2010/0038937 A1 | 2/2010 | Andersson et al. |
| 2010/0140986 A1 | 6/2010 | Sawada |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0063081 A1 | 3/2012 | Grunwald |

(56) References Cited

U.S. PATENT DOCUMENTS

| | | |
|---|---|---|
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.aboutcom/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ 2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

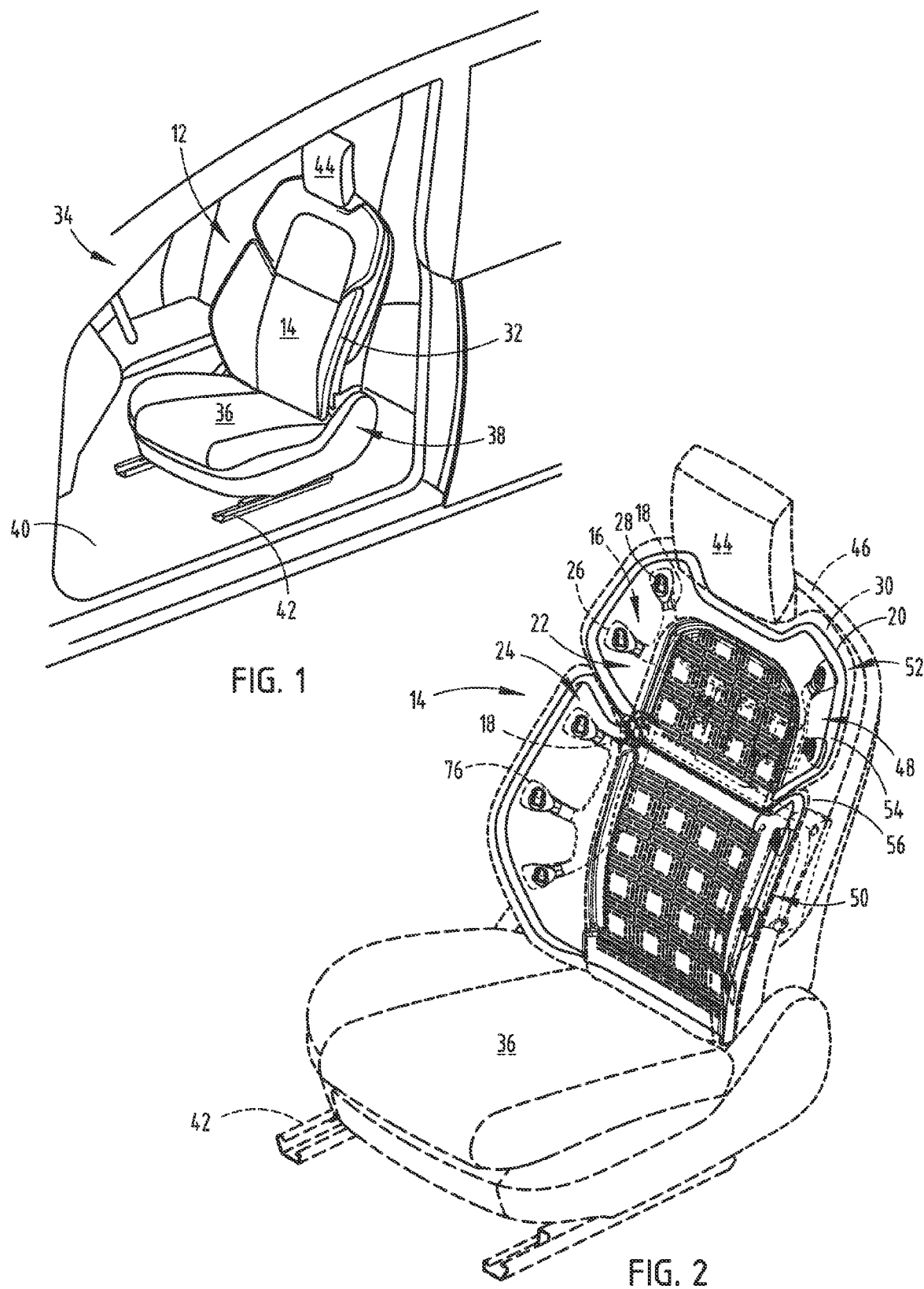

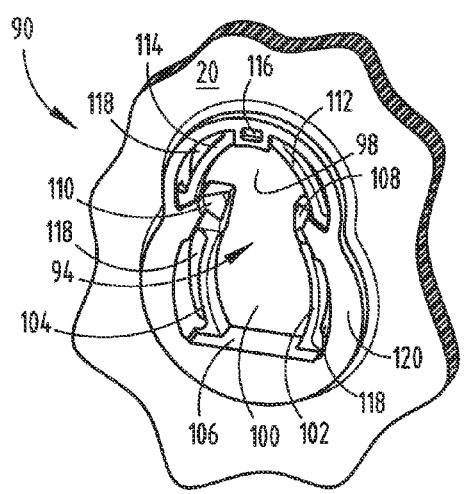
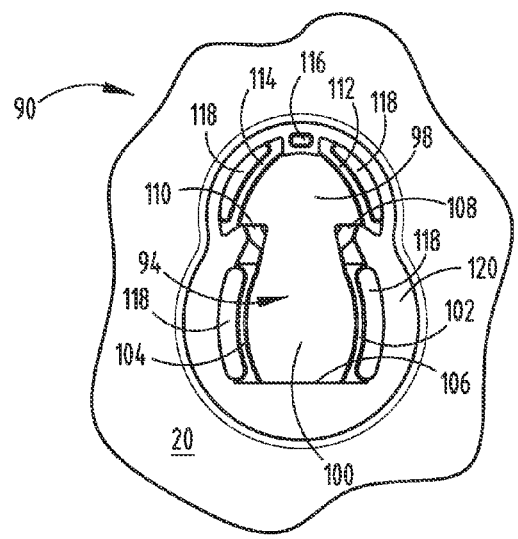
FIG. 5　　　　　　　　FIG. 6
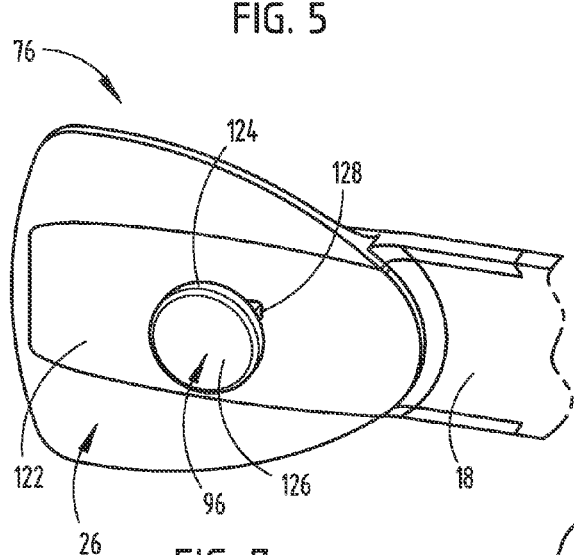
FIG. 7
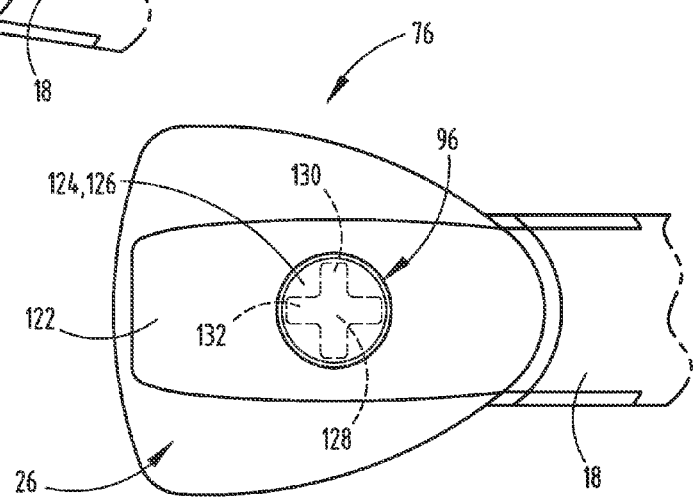
FIG. 8

QUICK-CONNECT TRIM CARRIER ATTACHMENT

FIELD OF THE INVENTION

The present invention generally relates to a vehicle seating assembly, and more particularly to a vehicle seating assembly with a quick-connect trim carrier attachment.

BACKGROUND OF THE INVENTION

Vehicle seating assemblies typically includes a cover stock material disposed over a cushion of the seat or seatback to support a passenger. Commonly, upon assembly, the cover stock material is sewn into a sock-like configuration that is stretched and pulled over the cushion and other portions of the seating assembly, such as the entire seat or seatback. Accordingly, these seating assemblies can be difficult to reupholster and can be easily damaged when accessing components within the seat or seatback.

SUMMARY OF THE INVENTION

According to one aspect of the present invention, a quick-connect assembly for a vehicle seating assembly includes a seatback. A suspension assembly includes a plurality of outwardly extending flex members. A removable trim carrier is disposed over upper and lower components and is removably coupled to distal ends of the plurality of outwardly extending flex members by a friction-fit connection. A passenger support is operably coupled with the trim carrier. An external peripheral gap is defined between the passenger support and the seatback.

According to another aspect of the present invention, a vehicle seating assembly includes a seatback. First and second suspension components each include at least two outwardly extending flex members. A trim carrier includes a plurality of engagement members removably coupled with a securing feature disposed on the distal ends of the flex members. An external peripheral gap is defined between the seatback and the trim carrier.

According to yet another aspect of the present invention, a vehicle seating assembly includes a seatback. An upper suspension assembly includes outwardly extending flex members operably coupled to an upper trim carrier. A lower suspension assembly includes outwardly extending flex members operably coupled to a lower trim carrier. A passenger support is operably coupled with the upper and lower trim carriers. An external peripheral gap is defined between the upper and lower trim carriers and the seatback.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a vehicle seating assembly in a vehicle;

FIG. 2 is a top perspective view of a quick-connect assembly having portions of the vehicle seating assembly shown in dashed lines;

FIG. 5 is a cutaway top perspective view of an engagement member of the quick-connect assembly, taken at line V of FIG. 4;

FIG. 6 is a front elevational view of the engagement member of the quick-connect assembly of FIG. 5;

FIG. 7 is a cutaway top perspective view of a securing feature of the quick-connect assembly, taken at line VII of FIG. 4;

FIG. 8 is a front elevational view of the securing feature of the quick-connect assembly of FIG. 7;

DETAILED DESCRIPTION OF THE EMBODIMENTS

Figure 3:
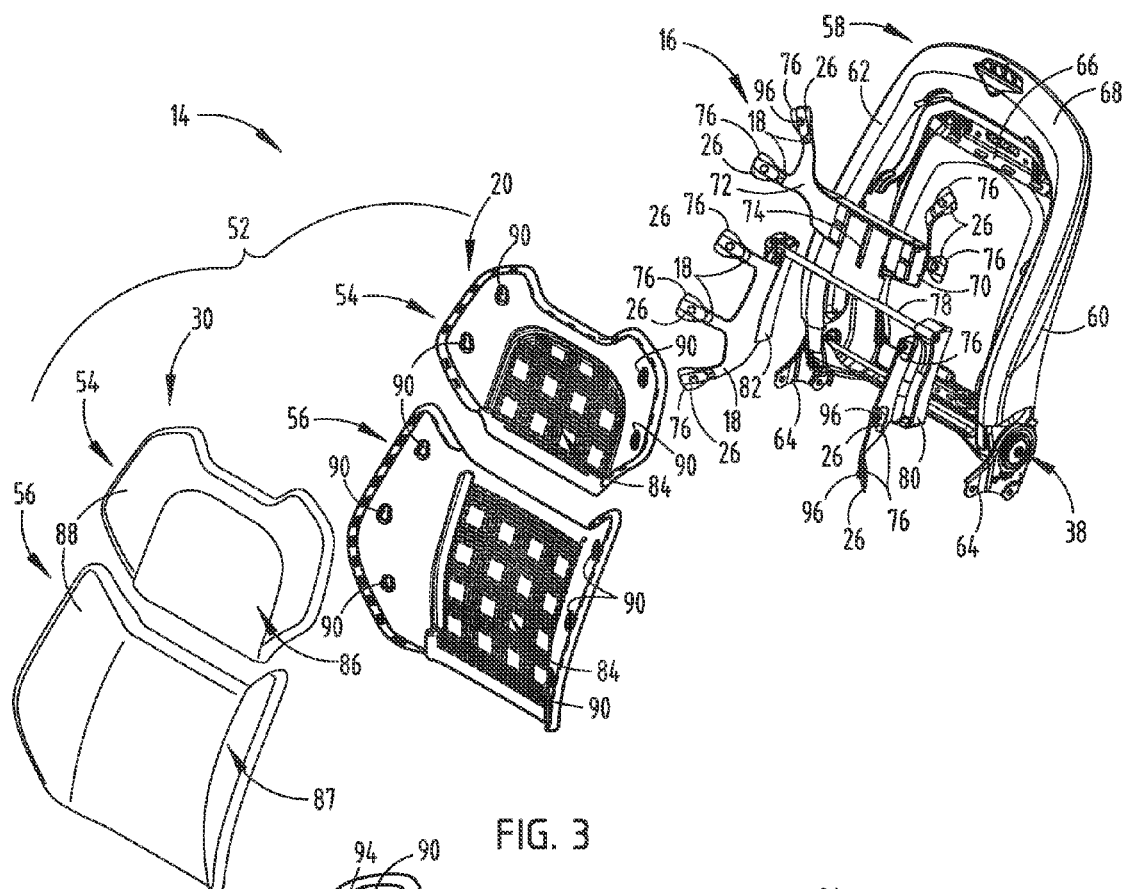
FIG. 3 is an exploded top perspective view of a seatback of the vehicle seating assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a quick-connect assembly for a vehicle seating assembly 12 that includes a seatback 14. A suspension assembly 16 includes a plurality of outwardly extending flex members 18. A removable trim carrier 20 is disposed over upper and lower components 22, 24 and is removably coupled to distal ends 26 of the plurality of outwardly extending flex members 18 by a friction-fit connection 28. A cushion 30 is operably coupled with the trim carrier 20. An external peripheral gap 32 is defined between the trim carrier 20 and the seatback 14.

Referring now to FIG. 1, the vehicle seating assembly 12 is positioned in a driver's side location of a vehicle 34. The vehicle seating assembly 12 includes a seat 36 that is pivotally coupled with the seatback 14 about a recliner mechanism 38 for pivotally adjusting the seatback 14 relative to the seat 36. The seat 36 is slideably coupled with a floor 40 of the vehicle 34 about a track assembly 42. The track assembly 42 is configured to allow the vehicle seating assembly 12 to be adjusted in a forward and rearward direction relative to the vehicle 34. It is understood that the vehicle seating assembly 12 may be positioned at various locations throughout the vehicle 34 other than the illustrated position, such as the passenger side location, a mid-row location, and a rear seat location. It is also conceivable that the seat 36 may not include the track assembly 42 and may be fixedly or alternatively coupled with the floor 40 of the vehicle 34.

As illustrated in FIG. 2, the seatback 14 of the vehicle seating assembly 12 has a head restraint 44 coupled with a top portion 46 of the seatback 14 to support a passenger's head. The suspension assembly 16 is coupled with the seatback 14 between the head restraint 44 and the seat 36. The suspension assembly 16 includes a first suspension component 48 positioned above a second suspension 50 component, such that the first suspension component 48 may be referred to as the upper component 22 and the second suspension component 50 may be referred to as the lower component 24. The quick-connect assembly 10 includes a passenger support 52 is removably coupled with the suspension assembly 16 to support a passenger's back. More specifically, an upper segment 54 and a lower segment 56 of the passenger support 52 are removably coupled, respectively, with the upper component 22 and the lower component 24 of the suspension assembly 16. It is conceivable that the suspension assembly 16 may be alternatively shaped and/or positioned on the seatback 14 and may include more suspension components or a single suspension component spanning over the seatback 14. Accordingly, it also conceivable that the passenger support 52 may vary in shaped and/or position on the seatback 14 and may include more or fewer segments, consistent with or divergent from the number of suspension components. In addition, it is contemplated that the head restraint 44 may be integrated with the top portion 46 of the seatback 14 or may otherwise not be included on the vehicle seating assembly 12.

As shown in the embodiment illustrated in FIG. 3, the seatback 14 includes a seatback structure 58 that has a first side support 60 and a second side support 62 extending upward in generally parallel alignment from a recliner bracket 64 to a top portion 46 of the seatback 14. The first and second side supports 60, 62 pivotally couple with the recliner brackets 64 about the recliner mechanism 38 and curve upward and rearward from the recliner brackets 64 to provide a curved shape that is similar to a passenger's spinal column. The side supports 60, 62 are more robust proximate the recliner bracket 64 and taper as they extend upward to couple with the top portion 46 of the seatback 14 that extends generally orthogonally between the first and second side supports 60, 62. The seatback structure 58 includes a metal frame 66 that is substantially enclosed with a polymer trim shroud 68 generally concealing the edge portions of the metal frame 66. It is conceivable that the seatback structure 58 may be alternatively shaped and/or configured with an alternative combination of components and materials.

The suspension assembly 16, as illustrated in FIG. 3, couples with and generally extends forward from the seatback structure 58 to removably couple with the passenger support 52 and define the external peripheral gap 32 (FIG. 2) between the passenger support 52 and the seatback structure 58. The first suspension component 48 of the suspension system generally includes a first arm 70, a second arm 72, and a central body 74 disposed there between. The first and second arms 70, 72 each have a pair of finger-shaped flex members 18, wherein two of the flex members 18 laterally extend from the arms 70, 72 and two of the flex members 18 vertically extend from the arms 70, 72. The flex members 18 each include a securing feature at the distal ends 26 thereof. The central body 74 of the first suspension component 48 is coupled with a pivot bar 78 that laterally extends between and pivotally couples with the first and second side supports 60, 62 of the seatback structure 58 to allow the first suspension component 48 to pivot forward and rearward about the pivot bar 78. It is conceivable that the pivot bar 78 may be operably coupled with a motor to adjustably pivot the pivot bar 78 and the upper component 22 forward and rearward relative to seatback structure 58. The second suspension component 50 includes a first side portion 80 and a second side portion 82 that are separate and distinct from each other. The first and second side portions 80, 82 each have three outwardly extending finger-shaped flex members 18. The distal end 26 of each flex member 18 has a securing feature 76 disposed thereon. It is also contemplated that the suspension assembly 16 may include more, fewer, or alternatively shaped flex members 18 extending from the seatback 14 to removably engage the passenger support 52. For instance, the first and second side portions 80, 82 may each include a single fin-shaped flex member 18 interconnecting and substantially eliminating the three separate finger-shaped flex members 18.

Still referring to the embodiment shown in FIG. 3, the upper segment 54 and the lower segment 56 of the passenger support 52, each include a trim carrier 20 and a cushion 30. The trim carrier 20 removably couples to the securing features 76 on the distal ends 26 of the flex members 18 by a friction-fit connection 28 (FIG. 2). The trim carrier 20 includes a substantially polymer-based material that is formed to have an open matrix 84 defining a pattern of resilient elements configured to support the weight of a passenger, to provide ventilation, and to conform to the contour of a passenger's back. It is contemplated that the trim carrier 20 may lack openings or include a varied shape and arrangement of the open matrix 84. As shown, the trim carrier 20 has two separate molded plastic panels, one for each of the upper and lower segments 54, 56 of the passenger support 52. However, it is conceivable that the upper and lower segments 54, 56 may be a single piece and the trim carrier 20 may include a living hinge to allow for pivotal movement of the suspension assembly 16.

The cushion 30, as illustrated in FIG. 3, is disposed over and operably coupled with the trim carrier 20. The cushion 30 includes an upper piece 86 positioned over the upper segment 54 of the trim carrier 20 proximate the first suspension component 48. Similarly, the cushion 30 includes a lower piece 87 positioned over the lower segment 56 of the trim carrier 20 proximate the second suspension component 50. It is conceivable that the cushion 30 may be a single integral piece that is disposed over the trim carrier 20 or may include further divisions and portions. The cushion 30 may include a matrix of woven fibers that have open areas to allow ventilation, an open-cell foam, a closed-cell foam, and other alternative flexible and/or breathable materials. The cushion 30 includes a cover stock 88 disposed over at least the exterior portion of the cushion 30. The cover stock 88 may conceivably be comprised of fabric, leather, pleather, vinyl, or other vehicle upholstery materials as generally understood in the art. Further, it is conceivable that the cushion 30 may simply include a cover stock 88 without a foam material or other flexible portion that is configured to provide a cushioned support over the trim carrier 20.

Figure 4:
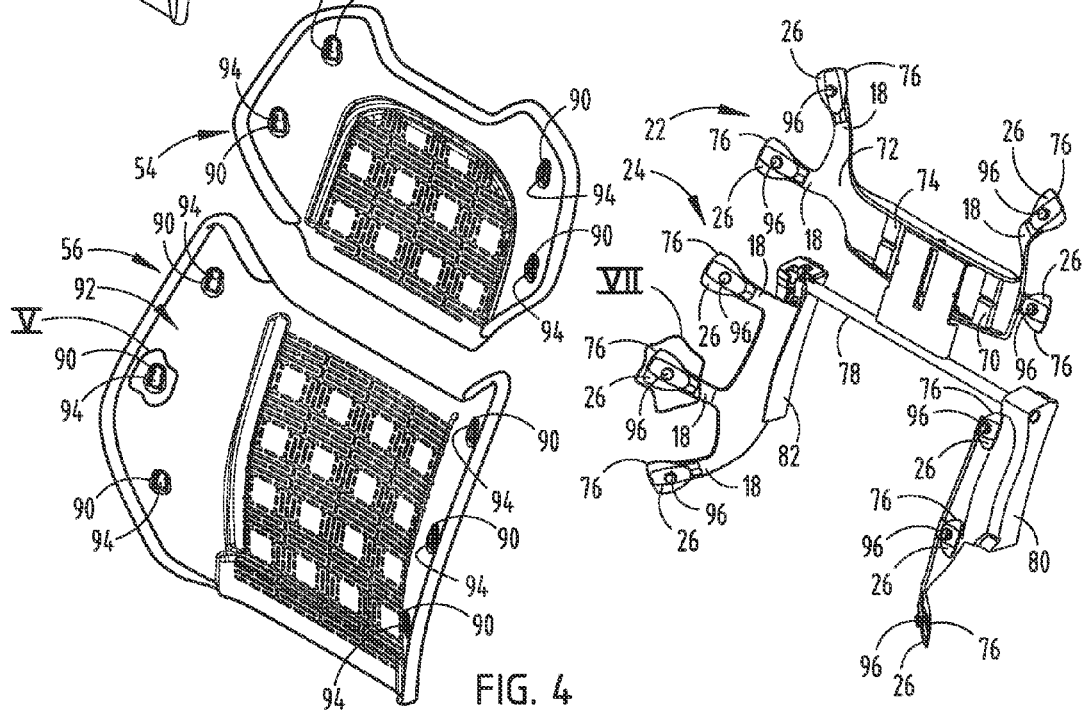
FIG. 4 is an exploded top perspective view of a suspension assembly and a trim carrier of the quick-connect assembly.

Referring now to the embodiment illustrated in FIG. 4, the passenger support 52 includes a plurality of engagement members 90 spaced on a periphery 92 of the trim carrier 20 to removably couple with the securing features 76 on the flex members 18. The upper segment 54 of the passenger support 52 includes two engagement members 90 on opposing sides of the trim carrier 20 to align with securing features 76 disposed on the distal ends 26 of the flex members 18 of the upper component 22. Similarly, the lower segment 56 of the passenger support 52 includes three engagement members 90 on opposing sides of the trim carrier 20 to align with securing features 76 disposed on the distal ends 26 of the flex members 18 of the lower component 24. The engagement members 90 each define a keyhole slot 94 configured to removably couple a keyed protuberance 96 on the plurality of outwardly extending flex members 18. The keyhole slots 94 on each of the upper and lower segments 54, 56 are positioned in generally vertical parallel alignment with each other to allow for the friction-fit connection 28 (FIG. 2) with the securing feature 76, as described in more detail below. It is contemplated that engagement members 90 may be alternatively positioned or constructed to engage the securing features 76.

As shown in FIGS. 5-6, the keyhole slot 94 of the engagement member 90 includes an upper region 98 and a lower region 100 that each extend through the trim carrier 20 to define an aperture. The lower region 100 is defined on opposing sides by a first pliable element 102 and a second pliable element 104, each having a curvature bordering the lower region 100. A base surface 106 horizontally extends between the bottom ends of the first and second pliable elements 102, 104 to further define the lower region 100. A first locking protrusion 108 and a second locking protrusion 110 each extend inward toward the other between the upper region 98 and the lower region 100 of the keyhole slot 94. A third pliable element 112 and a fourth pliable element 114 extend upward from the locking protrusions 108, 110 at a curvature that borders the upper region 98 to couple with a keystone element 116 centrally located at the uppermost portion of the keyhole slot 94. The pliable elements 102, 104, 112, 114 each define a deformation aperture 118 between the pliable element 102, 104, 112, 114 and an outer portion 120 of the engagement member 90. Accordingly, the deformation apertures 118 are disposed about a perimeter of the engagement member 90. It is conceivable that a single end of the pliable elements 102, 104, 112, 114 may be coupled with the outer portion 120 of the engagement member 90 to similarly define the deformation apertures 118. In addition, the upper and lower regions 98, 100 of the keyhole slot 94 may be alternatively shaped and constructed from the illustrated embodiment.

The securing feature 76, as shown in FIGS. 7-8, includes a paddle shaped backing plate 122 on the distal end 26 of the flex member 18. The keyed protuberance 96 orthogonally extends forward from a central portion of the backing plate 122. The keyed protuberance 96 has a disc shaped bulbous end 124 with a forward facing surface 126 in parallel alignment with a planar extent of the backing plate 122. The bulbous end 124 is coupled to the backing plate 122 with a connection member 128. The connection member 128 has a cross section with a plus sign shape, such that a vertically extending portion 130 of the connection member 128 has a width substantially equal to a horizontally extending portion 132. The widths of both the vertically and horizontally extending portions 130, 132 are less than the diameter of the bulbous end 124. It is contemplated that the connection member 128, the bulbous end 124, and other portions of the securing feature 76 may be alternatively shaped to correlate with and form the friction-fit connection 28 with the engagement member 90.

Figure 9:
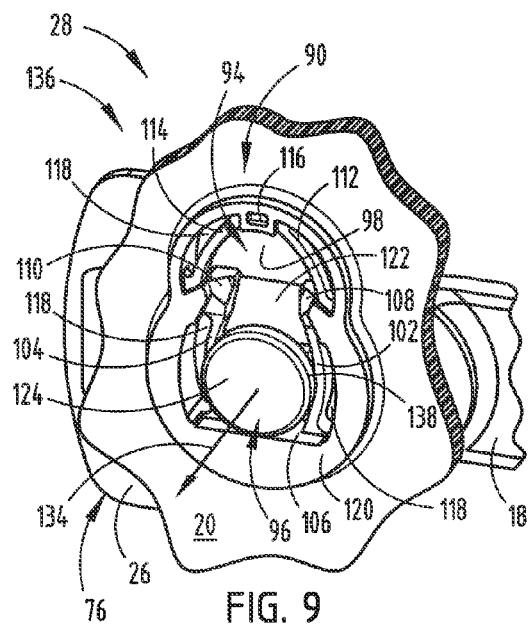
FIG. 9 is a front top perspective view of the securing feature engaged with a lower region of the engagement member.
Figure 9A:
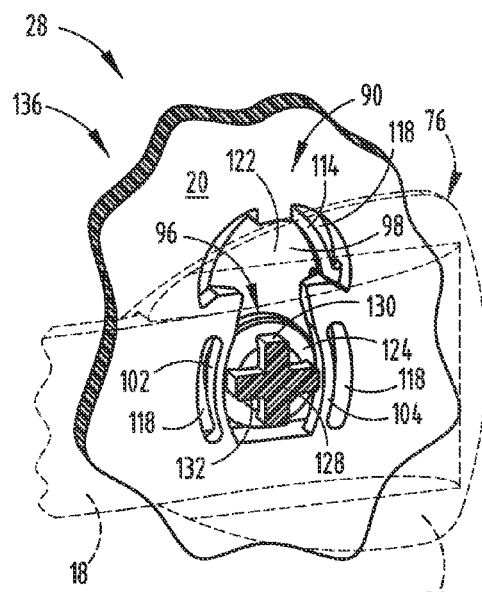
FIG. 9A a rear top perspective view of the securing feature engaged with the lower region of the engagement member, having a portion of a flex member shown in dashed lines.

Referring to the embodiment shown in FIGS. 9-9A, the friction-fit connection 28 is initiated by the bulbous end 124 of the keyed protuberance 96 being centrally aligned with the lower region 100 of the keyhole slot 94, such that a longitudinal extent of the vertically extending portion 130 of the connecting member 128 divides the keyhole slot 94 into substantially mirror image halves. The bulbous end 124 of the keyed protuberance 96 is then centrally inserted into the lower region 100 of the keyhole slot 94 by applying a forward linear force 134 to the flex member 18 and/or an opposing rearward linear force to trim carrier 20. The linear force 134 moves the keyed protuberance 96 to an inserted position 136 within the keyhole slot 94. It is contemplated that the various engagement members 90 and securing features 76 may be separately or simultaneously aligned and inserted to form the friction-fit connection 28.

Figure 10:
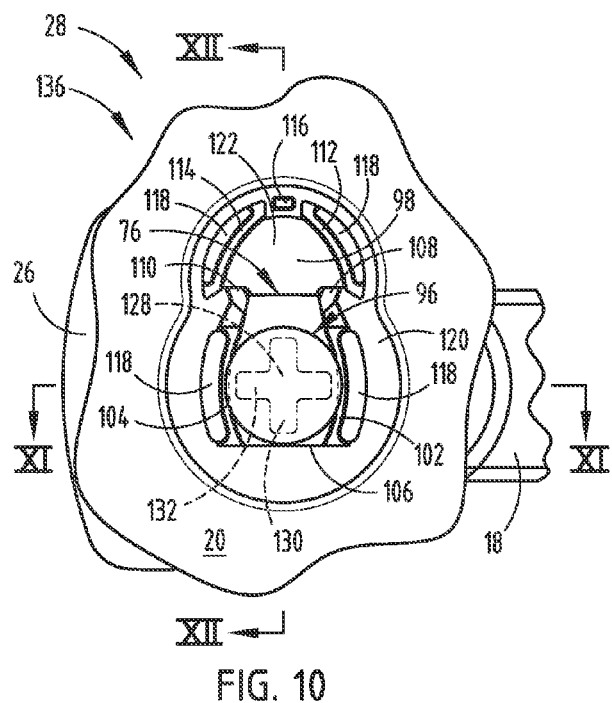
FIG. 10 is front elevational view of the securing feature engaged with the lower region of the engagement member.
Figure 10A:
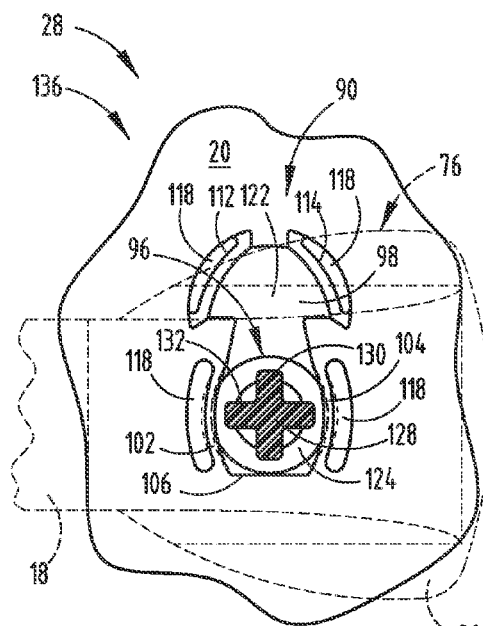
FIG. 10A is a rear elevational view of the securing feature engaged with the lower region of the engagement member, having a portion of the flex member shown in dashed lines.

As illustrated in FIGS. 10-10A, the bulbous end 124 has a slightly greater diameter than the lateral distance between the first and second pliable elements 102, 104 that border the lower region 100 of the keyhole slot 94. Accordingly, the first and second pliable elements 102, 104 elastically deform laterally, as shown in FIG. 10A, into the deformation apertures 118 upon applying the linear force 134 to insert the bulbous end 124. An edge portion 138 of the bulbous end 124 slides and overcomes the first and second pliable elements 102, 104, allowing the first and second pliable elements 102, 104 to release and laterally move inward toward the connection member 128 of the keyed protuberance 96. The width of the horizontally extending portion 132 of the connection member 128 is generally less than the lateral distance between the first and second pliable elements 102, 104. Thus, the first and second pliable elements 102, 104 are permitted to release and laterally move inward to regain the original curvature in close proximity to the connection member 128, while the edge portion 138 of the bulbous end 124 moves into abutting contact with the base surface 106. As such, the keyed protuberance 96 reaches the inserted position 136, having the pliable elements 102, 104 retained between the bulbous end 124 of the keyed protuberance 96 and the backing plate 122 and generally securing the trim carrier 20 to the flex member 18. It is conceivable that the lower region 100 of the keyhole slot 94 or the keyed protuberance 96 may be alternatively shaped or constructed to form the friction-fit connection 28.

Figure 11:
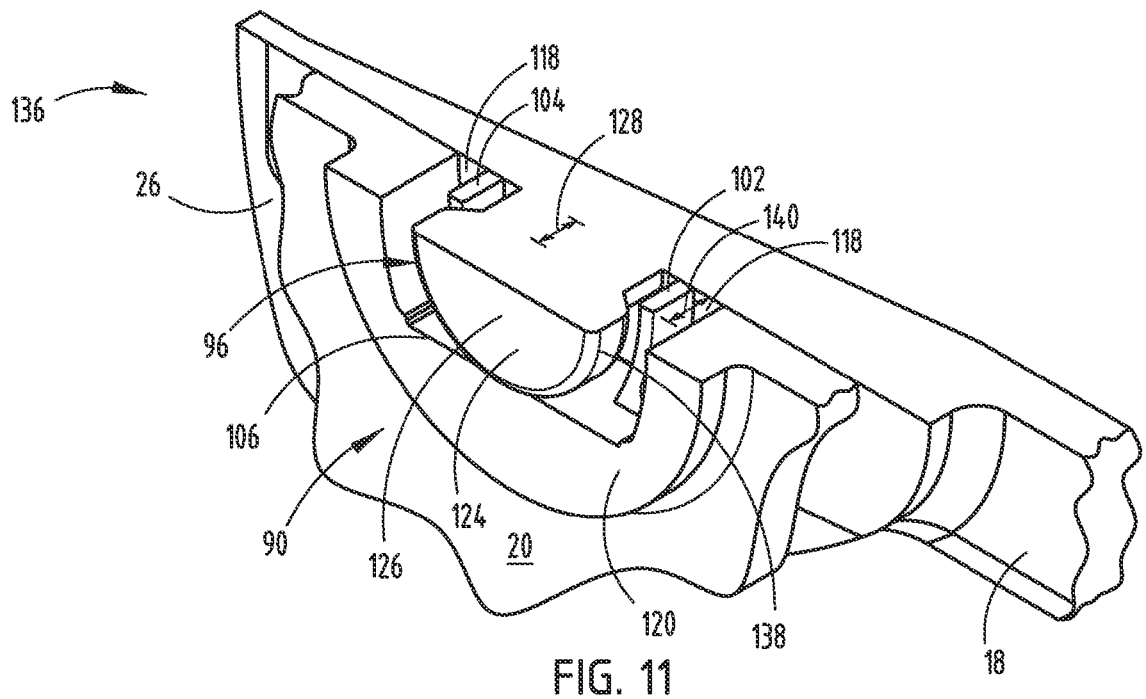
FIG. 11 is a cross-sectional top perspective view of the securing feature engaged with the lower region of the engagement member, taken at line XI-XI of FIG. 10.
Figure 12:
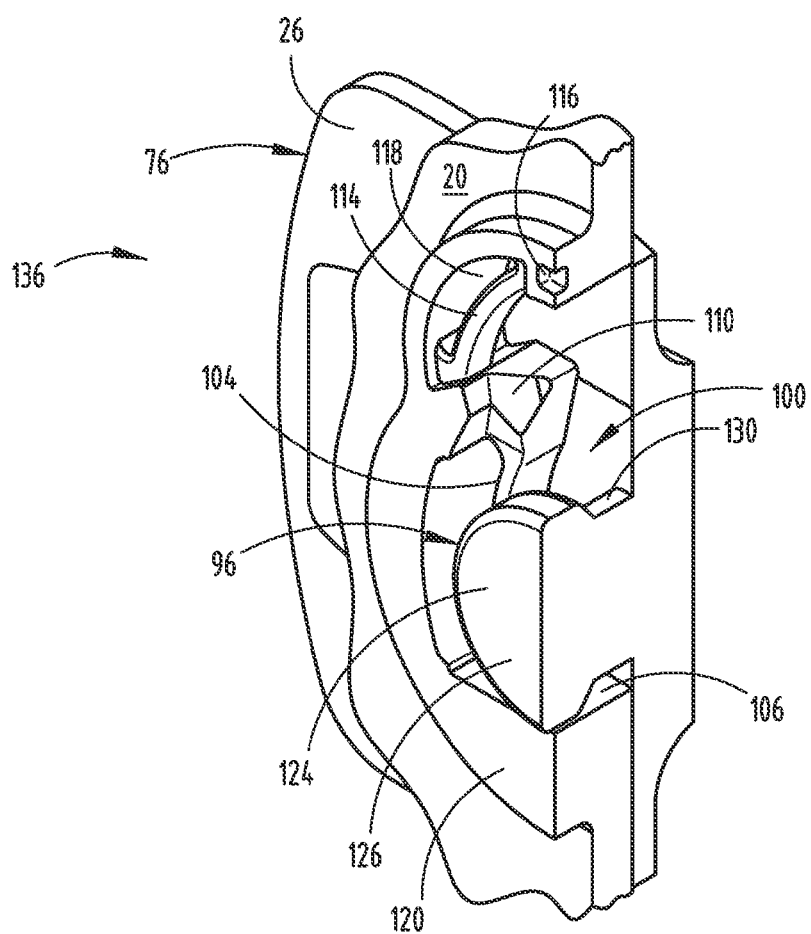
FIG. 12 is a cross-sectional top perspective view of the securing feature engaged with the lower region of the engagement member, taken at line XII-XII of FIG. 10.

The inserted position 136, as also illustrated in FIGS. 11-12, causes at least a tactile and audible cue from the pliable elements 102, 104 overcoming the bulbous end 124 of the keyed protuberance 96 to move into abutting contact with the backing plate 122, among other abutting engagements. In addition, the forward facing surface 126 of the bulbous end 124 is in generally planar alignment with the outer portion 120 of the engagement member 90, so as not to protrude into the cushion 30 (FIG. 3) of the passenger support 52 and disrupt a passenger. Also, it is shown that a depth 140 of the first and second pliable elements 102, 104 are similar to the length of the connection member 128 of the keyed protuberance 96 to provide a generally secure friction-fit connection 28 in the lower region 100 of the keyhole slot 94. It is also conceivable that the inserted position 136 causes a visual cue that indicates engagement of the engagement member 90 to the securing features 76.

Figure 13:
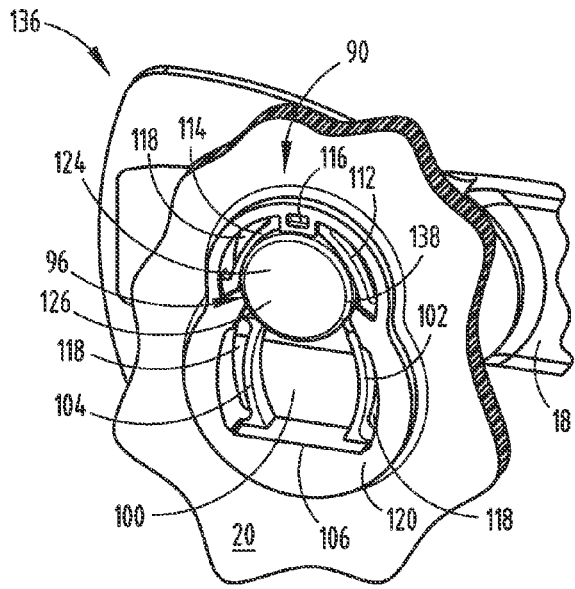
FIG. 13 is a front top perspective view of the securing feature engaged with an upper region of the engagement member, taken at line XIII of FIG. 17.
Figure 13A:
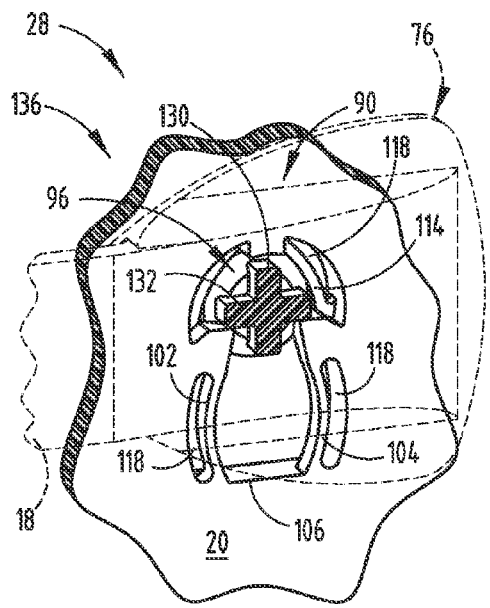
FIG. 13A a rear top perspective view of the securing feature engaged with the upper region of the engagement member, having a portion of a flex member shown in dashed lines.

Referring now to FIGS. 13-13A, the keyed protuberance 96 is moved from the inserted position 136 (FIG. 9) upward in the keyhole slot 94 to a locked position 142, substantially occupying the upper region 98 thereof. To move to the locked position 142 an upward linear force 144 is applied to the flex member 18 and/or an opposing downward linear force is applied to the trim carrier 20. In the locked position 142, the edge portion 138 of the bulbous end 124 moves into abutting contact with the keystone element 116 of the engagement member 90, thereby restricting further upward movement of the keyed protuberance 96. The horizontally extending portion 132 of the connection member 128 similarly moves over the first and second locking protrusions 108, 110 and into abutting contact with the upward facing surfaces 146 of the first and second locking protrusions 108, 110, thereby preventing downward movement of the keyed protuberance 96. Thus, in the locked position 142, the securing feature 76 is restricted from vertical movement and maintains the friction-fit connection 28. It is conceivable that the keyhole slot 94 and the keyed protuberance 96 may be shaped or constructed such that alternative forces and resulting movements may place them in a friction-fit connection 28.

Figure 14:
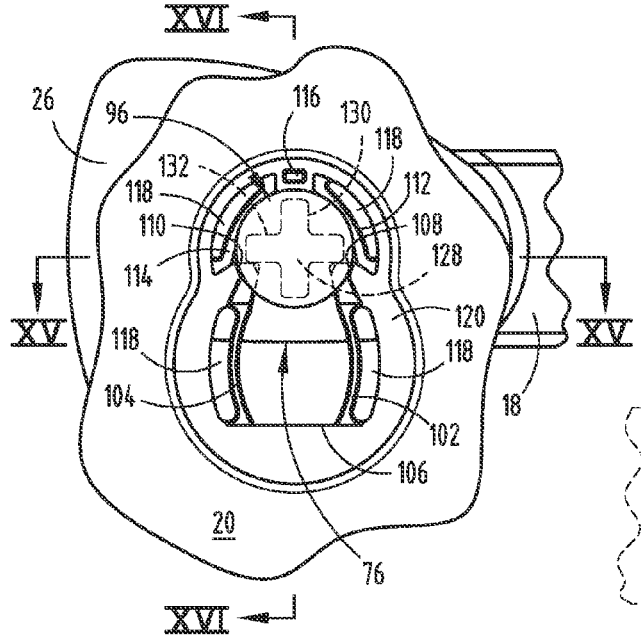
FIG. 14 is a front elevational view of the securing feature engaged with the upper region of the engagement member.
Figure 14A:
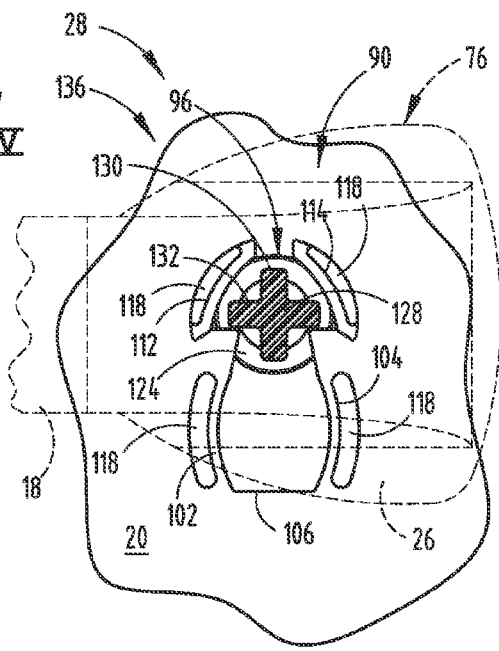
FIG. 14A is a rear elevational view of the securing feature engaged with the upper region of the engagement member, having a portion of the flex member shown in dashed lines.

As shown in FIGS. 14-14A, the width of the horizontally extending portion 132 of the connection member 128 is greater than the lateral distance between the first and second locking protrusions 108, 110. Accordingly, the upward linear force 144 must be great enough to elastically deform the horizontally extending portion 132 of the connection member 128 and/or the first and second locking protrusions 108, 110, allowing the keyed protuberance 96 to slide from the lower region 100 to the upper region 98 of the keyhole slot 94. The first and second locking protrusions 108, 110 each include a slanted surface 148 that angles inward proximate the upper region 98 of the keyhole slot 94, such that the connection member 128 slides on the slanted surface 148 to gradually flex the connection member 128 and/or the first and second locking protrusions 108, 110 as keyed protuberance 96 moves upward. After the connection member 128 overcomes the locking protrusions 108, 110, the elastic deformation subsides and the features regain the original shapes, as illustrated. The horizontal upward facing surfaces 146 of the first and second locking protrusions 108, 110 align with each other and engage the horizontally extending portions 132 of connection member 128, causing at least a tactile and audible cue. Thus, the locking protrusions 108, 110 are retained between the backing plate 122 and the lower portion of the bulbous end 124, securing the keyed protuberance 96 from forward and rearward displacement. It is also conceivable that the locked position 142 also generates a visual cue.

Figure 15:
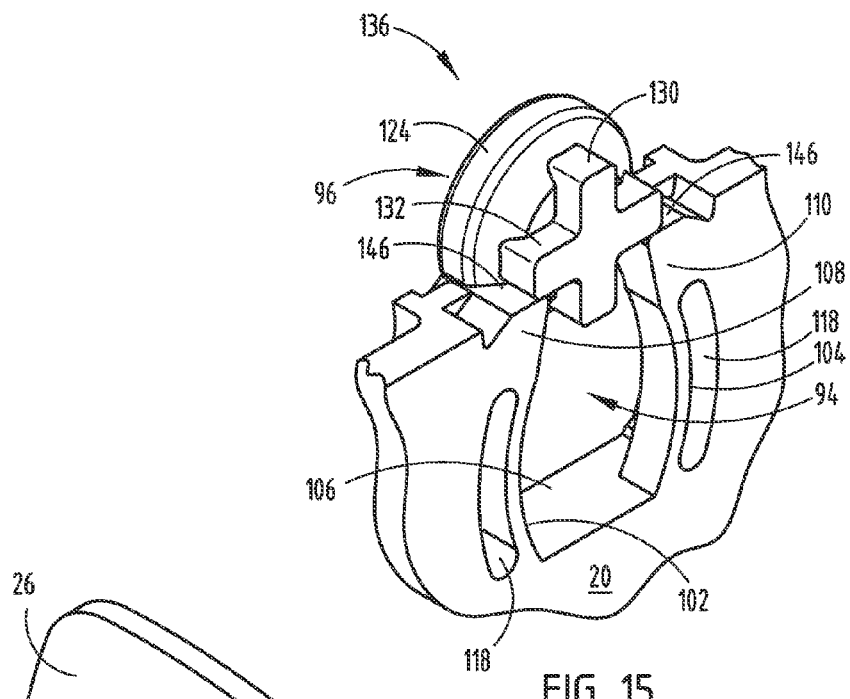
FIG. 15 is a cross-sectional top perspective view of the securing feature engaged with the upper region of the engagement member, taken at line XV-XV of FIG. 14.
Figure 16:
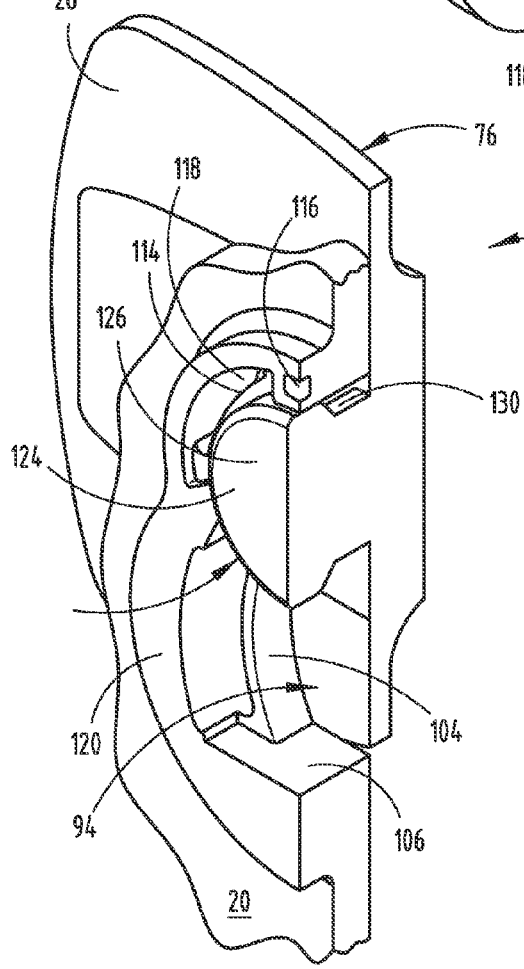
FIG. 16 is a cross-sectional top perspective view of the securing feature engaged with the lower region of the engagement member, taken at line XVI-XVI of FIG. 14.

As further illustrated in FIGS. 15-16, the third and fourth pliable elements 112, 114 bordering the upper region 98 of the keyhole slot 94 on opposing sides of the keystone element 116 are retained between the backing plate 122 and the bulbous end 124. As such, the locked position 142 provides a secure connection between the flex member 18 and the trim carrier 20, retaining the connection from forces in all directions. To remove the keyed protuberance 96 from locked position 142 in the upper region 98 of the keyhole slot 94, a forward linear force on the trim carrier 20 and/or a rearward linear force on the flex member 18 will flex the locking protrusions 108, 110 rearward and the third and fourth pliable elements 112, 114 into corresponding deformation apertures 118. It is contemplated that the keyed protuberance 96 is easier to remove from the keyhole slot 94 in inserted position 136 (FIG. 9) than in the locked position 142. It is also conceivable that the keyed protuberance 96 may be moved from the locked position 142 to the inserted position 136 (FIG. 9) before removing the keyed protuberance 96 from the keyhole slot 94.

Figure 17:
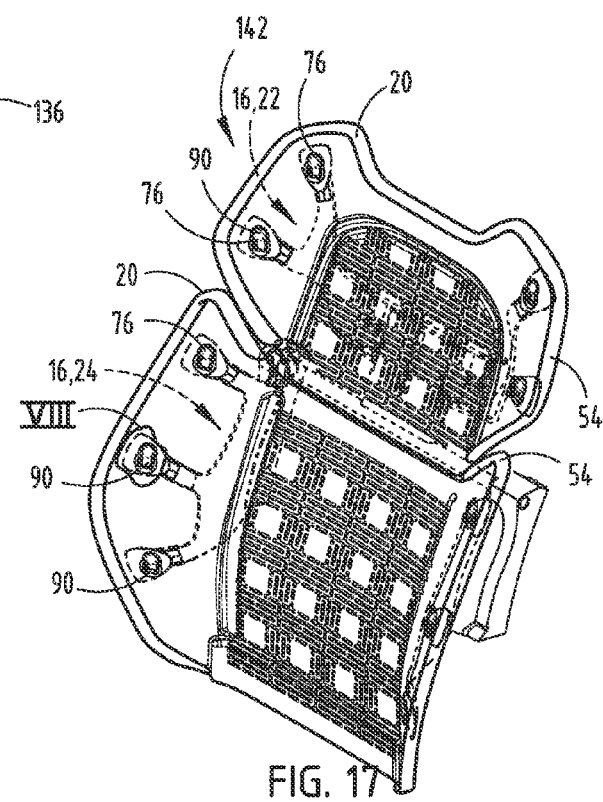
FIG. 17 is a top perspective view of the trim carrier engaged with the suspension assembly.

The trim carrier 20, as shown in FIG. 17, is engaged with the suspension assembly 16 in the locked position 142, having each securing feature 76 in a friction-fit connection 28 with each engagement member 90. It is conceivable that the various engagement members 90 and securing features 76 may be separately or simultaneously moved between the inserted position 136 (FIG. 9) and the locked position 142. It is also conceivable that the upper segment 54 of the trim carrier 20 may be separately removed from the upper suspension component 22 or that the lower segment 56 of the trim carrier 20 may be separately removed from the lower suspension component 24 for individual replacement or repair.

It is contemplated that the keyhole slot 94 and the keyed protuberance 96 may be alternatively shaped and/or arranged, such that the keyed protuberance 96 may still be inserted in a two step process to establish the friction-fit connection 28, with a snap-on and snap-off capability between the trim carrier 20 and the suspension system 16. For instance, the keyhole slot 94 may generally include an alternatively shaped or oriented upper region 98, referred to as a secondary region, and/or an alternatively shaped or oriented lower region 100, referred to as a primary region, to allow a two step process to establish the friction-fit connection 28. The keyed protuberance 96 may be inserted into such a primary region in a first step and moved to the secondary region in a second step to establish the friction-fit connection 28 between the trim carrier 20 and the seatback structure 58. The primary region in this first step provides a holding function for the trim carrier 20 and the secondary region in this second step provides a locking function for the trim carrier 20. As explained above, the friction-fit connection 28 may be undone and the trim carrier 20 may be removed from the flex members 18 by reversing the two step process. More specifically, the friction-fit connection 28 can be undone by moving the keyed protuberance 96 from the secondary region to the primary region, releasing the locking function, and then removing the keyed protuberance 96 from the primary region, discharging the holding function and detaching the trim carrier 20 proximate the keyed protuberance 96.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A quick-connect assembly for a vehicle seating assembly, comprising:
   a seatback;
   a suspension assembly including a plurality of outwardly extending flex members;
   a removable trim carrier disposed over upper and lower components and removably coupled to distal ends of the plurality of outwardly extending flex members by a friction-fit connection, wherein the trim carrier includes engagement members that define a keyhole slot configured to receive a keyed protuberance on the plurality of outwardly extending flex members;
   at least one deformation aperture disposed about a perimeter of the engagement members;
   a cushion operably coupled with the trim carrier; and
   an external peripheral gap defined between the trim carrier and the seatback.

2. The quick-connect assembly of claim 1, wherein coupling of the engagement members to the plurality of outwardly extending flex members causes one of a tactile, a visual, and an audible cue that indicates complete engagement of the engagement members.

3. The quick-connect assembly of claim 1, further comprising:
   a backing plate disposed on each of the distal ends of the plurality of outwardly extending flex members.

4. The quick-connect assembly of claim 1, wherein the upper component includes first and second distinct lower components.

5. The quick-connect assembly of claim 4, wherein the upper component includes a first flex member, a second flex member, and a central body disposed therebetween.

6. The quick-connect assembly of claim 4, wherein the upper component is operably coupled to an upper back support moveable between a forward position and a rearward position.

7. The quick-connect assembly of claim 1, wherein the trim carrier includes an open matrix defining a pattern of resilient elements configured to support the weight of a passenger.

8. A vehicle seating assembly, comprising:
   a seatback;
   first and second suspension components, each including at least two outwardly extending flex members;
   a passenger support including a plurality of engagement members removably coupled with a securing feature disposed on the distal ends of the flex members, each engagement member defining a keyhole slot;
   a deformation aperture proximate a perimeter of each keyhole slot; and
   an external peripheral gap defined between the seatback and the passenger support.

9. The vehicle seating assembly of claim 8, wherein the first suspension component is disposed above the second suspension component and is pivotal between forward and rearward positions.

10. The vehicle seating assembly of claim 8, wherein the first suspension component includes two substantially laterally extending flex members and two substantially vertically extending flex members.

11. The vehicle seating assembly of claim 8, wherein the second suspension component includes a first side portion and a second side portion, and wherein the first side portion is distinct and separate from the second side portion.

12. The vehicle seating assembly of claim 8, wherein coupling of the plurality of engagement members to the at least two outwardly extending flex members causes one of a tactile, a visual, and an audible cue that indicates complete engagement of the engagement members to the securing features.

13. The vehicle seating assembly of claim 8, wherein the passenger support includes a trim carrier that has an open matrix defining a pattern of resilient elements configured to support the weight of a passenger.

14. The vehicle seating assembly of claim 8, wherein the first suspension component and the first and second side portions are each independently flexible under the weight of a passenger.

15. The vehicle seating assembly of claim 8, wherein the trim carrier includes a first trim carrier part removably coupled with the first suspension component and a second trim carrier part removably coupled with the second suspension component.

16. A vehicle seating assembly, comprising:
   a seatback;
   an upper suspension assembly including outwardly extending flex members removably coupled to an upper trim carrier;
   a lower suspension assembly including outwardly extending flex members removably coupled to a lower trim carrier, the trim carriers and flex members being removably coupled via an friction fit defined by a protuberance engaged with an engagement slot; and
   a deformation aperture disposed at a perimeter of each engagement aperture.

* * * * *